Patented June 25, 1946

2,402,611

UNITED STATES PATENT OFFICE 2,402,611

CYCLIC DIAZO COMPOUNDS

Joseph B. Dickey and James G. McNally, Rochester, N. Y., assignors to Eastman Kodak Company, Rochester, N. Y., a corporation of New Jersey No Drawing. Application June 4, 1942, Serial No. 445,724

11 Claims. (Cl. 260—243)

This invention relates to stable cyclic diazo compounds and to their preparation.

It is an object of our invention to provide stable cyclic diazo compounds. Another object is to provide stable cyclic diazo compounds which may be used in the preparation of valuable azo dye compounds suitable for the coloration of organic derivatives of cellulose such as cellulose acetate as well as other textile materials such as wool, silk and Nylon. A further object is to provide stable cyclic diazo compounds which may be used in the dyeing and printing of textile materials. A still further object is to provide a satisfactory process for the preparation of the cyclic diazo compounds of the invention.

We have discovered that stable cyclic diazo compounds can be prepared by diazotizing an o-aminobenzenesulfoneamide compound having the formula:

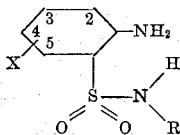

wherein R stands for an alkyl group, a cycloalkyl group, an allyl group, an aralkyl group, a furfuryl group, a benzene nucleus or a naphthalene nucleus and X means that at least one of the hydrogen atoms in the positions numbered 2, 3, 4 and 5 is replaced by a univalent non-metallic substituent other than —NH₂, and pouring into water.

As a general rule, if the above procedure is carried out, a crystalline yellow cyclic diazo compound having the formula:

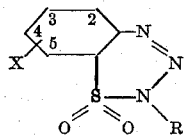

wherein R stands for a member selected from the group consisting of an alkyl group, a cycloalkyl group, an allyl group, an aralkyl group, a furfuryl group, a benzene nucleus and a naphthalene nucleus and X means that at least one of the hydrogen atoms in the positions numbered 2, 3, 4 and 5 is replaced by a univalent non-metallic substituent other than —NH₂, separates.

In some instances, in order to get the cyclic diazonium compound to precipitate, it is necessary to neutralize all or part of the excess mineral or organic acid used in the diazotization of the o-aminobenzenesulfoneamide compound. Neutralization, when necessary, can ordinarily be conveniently effected with a salt such as sodium bicarbonate or sodium carbonate although an alkali such as sodium hydroxide can be used. It has been our experience that the instances in which the cyclic diazonium compound fails to precipitate upon merely pouring into water occur particularly when the o-aminobenzenesulfoneamide compound contains a water-solubilizing group. Neutralization is ordinarily necessary where the benzene nucleus contains, for example, a sulfonic acid or a carboxylic acid group and in those cases where R is a group such as hydroxyalkyl, sulfoalkyl or carboxyalkyl.

The cyclic diazo compounds of our invention are, for the most part, quite stable to both dry and wet heat. In the latter instance the compounds must be wet with a suitable liquid, such as water, and should be about neutral. It is our experience that the cyclic diazo compounds described herein can be heated to their melting points with little decomposition. Also, we have found that they may be heated in water to 80° C.–85° C. with little or no decomposition.

In the presence of an organic acid such as acetic acid, formic acid or propionic acid or an inorganic acid such as hydrochloric acid, sulfuric acid or phosphoric acid, the cyclic diazo compounds of our invention dissociate to give the normal diazo or diazonium salt. These latter compounds are, for the most part, relatively stable and couple with suitable aromatic amines, phenols and other compounds containing an active hydrogen to form azo dye compounds.

In the presence of a base such as sodium hydroxide or potassium hydroxide, the cyclic diazo compounds of our invention dissociate to give diazo or diazonium hydroxide salts which are in many cases relatively stable. These latter compounds couple with coupling components such as phenols, aromatic amines and compounds containing an active hydrogen to form azo dye compounds.

While our invention relates broadly to the cyclic diazo compounds having the formula given hereinbefore, it relates more particularly to those compounds having the formula:

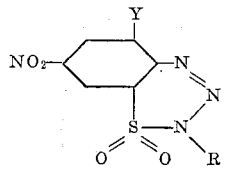

wherein R stands for a member selected from the group consisting of an alkyl group, a cycloalkyl group, an allyl group, an aralkyl group, a furfuryl group, a benzene nucleus and a naphthalene nucleus and Y stands for a member selected from the group consisting of hydrogen, a nitro group and a halogen atom. Generally speaking, compounds of the above formula appear to be advantageous. Similarly, compounds, wherein R in the formulae given is alkyl appear to be advantageous.

We would here note that the univalent nonmetallic substituent represented by X may be, for example, a nitro group, a halogen atom, an alkyl group, an alkoxy group, a sulfonic acid group, a sulfonamide group, an alkylsulfone group, a ketone group, a carboxyl group, a carboxamide group, a carboxylic acid ester group, a sulfonic acid ester group, an acylamino group, a cyano group and a thiocyano group. Ordinarily only 1 or 2 such substituents are present.

As previously indicated, the cyclic diazo compounds of our invention can be used in the preparation of valuable azo dyes useful for the coloration of organic derivatives of cellulose, especially cellulose acetate, silk, wool and Nylon. When used in the preparation of azo dyes, they can be dissociated to yield diazonium salts which can in turn be coupled with a coupling compound such as phenol, p-cresol, o-cresol, N-di-β-hydroxyethylaniline, N-diemethylaniline, N-ethyl,β-hydroxyethylaniline, N-mono-γ-hydroxypropylaniline, N-mono-β-hydroxyethyl-meta-toluidine, N-β,γ-dihydroxypropyl-2-methyltetrahydroquinoline, N-β-hydroxyethyl-2,7-dimethyltetrahydroquinoline or N-β,γ-dihydroxypropyl-2-methylphenmorpholine to yield valuable azo dye compounds.

The cyclic diazo compounds of the invention may also be used as stabilized diazo compounds in the well known naphthol dyeing or printing art. When used in printing and dyeing textile materials, such as cellulose acetate, wool, silk and Nylon, the textile material may be impregnated with a suitable developer component and the cyclic diazo compound then suitably dissociated and applied. Similarly, the cyclic diazo compound may be applied to the textile material and then developed with a developer component.

Because of their stability to heat and their crystalline form, the cyclic diazo compounds of the invention may be conveniently stored and handled. This constitutes an important commercial advantage. Of course, it will be understood that the customary precautions taken in handling compounds of this general nature will be observed.

It will be understood that when R is an alkyl group it may be an unsubstituted alkyl group such as a methyl group, an ethyl group, a propyl group or a butyl group or a substituted alkyl group such as β-hydroxyethyl, β-hydroxypropyl, β,γ-dihyroxypropyl, γ-hydroxypropyl, β-methoxyethyl, β-ethoxyethyl, β-chloroethyl, β-sulfoethyl, β-sulfopropyl, γ-sulfopropyl, β-sulfato- ethyl, β-sulfatopropyl, γ-sulfatopropyl and hydroxyalkyl groups esterified to an acid ester of an acid of phosphorus such as β-phosphatoethyl, γ-phosphatoethyl and β-phosphitoethyl. We would here note, however, that when the member X is an alkyl group it is normally an unsubstituted alkyl group.

The expression "a furfuryl group" includes not only the furfuryl group itself but also furfuryl derivatives such as 5-methylfurfuryl, 5-ethylfurfuryl, 5-β-hydroxyethylfurfuryl, 5-γ-hydroxypropylfurfuryl, tetrahydrofurfuryl, 5-methyltetrahydrofurfuryl, 5-ethyltetrahydrofurfuryl, 5-β-hydroxyethyltetrahydrofurfuryl and 5-γ-hydroxyethyltetrahydrofurfuryl and 5-γ-hydroxypropyltetrahydrofurfuryl. Similarly, when R is a benzene nucleus or a naphthalene nucleus, it may be an unsubstituted benzene or naphthalene nucleus or one of these nuclei substituted with a substituent such as a nitro group, a halogen atom, an alkyl group, a hydroxy group or an alkoxy group.

Illustrative cycloalkyl groups include cyclobutyl, cyclohexyl and cycloheptyl. Similarly, illustrative of aralkyl may be mentioned benzyl and phenylethyl.

The following examples illustrate the preparation of the cyclic diazo compounds of our invention:

Example 1

0.1 gram mole of 1-amino-4-nitrobenzene-6-sulfonethylamide is diazotized in acetic acid with nitrosyl sulfuric acid in the usual manner at a temperature of 0–5° C. Upon completion of the diazotization reaction, the diazonium solution is poured into water with stirring. A yellow crystalline compound separates almost immediately and is recovered by filtration, washed with water and dried. The cyclic diazo compound obtained has the formula:

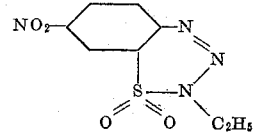

The ethyl group of the sulfonamide compound can be replaced, for example, by a methyl, a propyl, a butyl, an amyl, an allyl, an octyl, a decyl, a cetyl, a cyclohexyl, a β-methoxyethyl, a β-ethoxyethyl, a β-phenoxyethyl or a tetrahydrofurfuryl group and the reaction conducted as described above to obtain cyclic diazo compounds of our invention which have the same formula as that of the example except for the fact that the ethyl group is replaced by the groups above named.

Example 2

0.1 gram mole of 1-amino-2,4-dinitrobenzene-6-sulfonethylamide is diazotized in acetic acid with nitrosylsulfuric acid at a temperature of 0–5° C. in the usual manner. A yellow crystalline compound separates at once and is recovered by filtration, washed with water and dried. The cyclic diazo compound obtained has the formula:

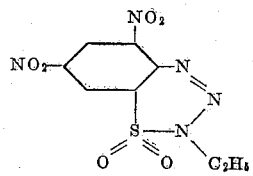

Example 3

0.1 gram mole of 1-amino-2,4-dinitrobenezene-6-sulfone-β-hydroxyethylamide is diazotized in accordance with the procedure described in Example 1. The diazonium solution obtained is poured into water with stirring and the excess acid present is neutralized by the addition of a base such as sodium carbonate or sodium bicarbonate. Upon neutralization of the reaction mixture, a yellow crystalline compound separates and is recovered by filtration, washed with a cold dilute aqueous sodium chloride solution and dried. The cyclic diazo compound obtained has the formula:

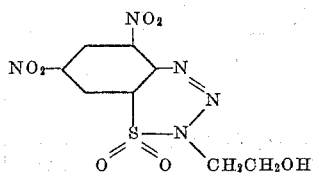

Example 4

0.1 gram mole of 1-amino-4-nitrobenzene-6-sulfonallylamide is diazotized and the reaction mixture is worked up as described in Example 1. The cyclic diazo compound obtained has the formula:

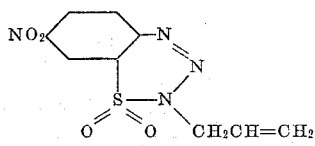

Example 5

0.1 gram mole of 1-amino-2,4-dinitrobenzene-6-sulfone-cyclohexylamide is diazotized in accordance with the method described in Example 1 and the reaction mixture obtained is likewise worked up as described in Example 1. The cyclic diazo compound obtained has the formula:

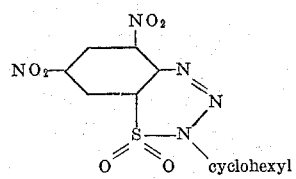

Exampe 6

0.1 gram mole of 1-amino-2-chloro-4-nitrobenzene-6-sulfonebenzylamide is diazotized in accordance with the procedure described in Example 1 and the reaction mixture is likewise worked up as described in Example 1. The cyclic diazo compound obtained has the formula:

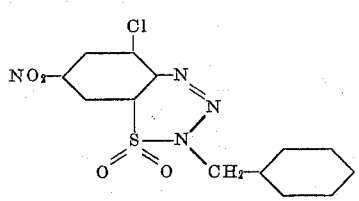

Example 7

0.1 gram mole of 1-amino-4-nitrobenzene-6-sulfonephenylamide is diazotized in accordance with the general method described in Example 1 and the diazonium solution resulting is worked up also as described in Example 1. The yellow crystalline cyclic diazo compound obtained has the formula:

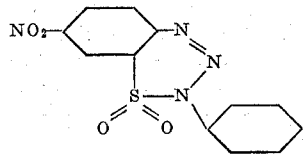

Example 8

0.1 gram mole of 1-amino-2-bromo-4-nitrobenzeneazo-6-sulfonenaphthylamide is diazotized in accordance with the general method described in Example 1 and the diazonium solution resulting is worked up as described in Example 1. The yellow crystalline cyclic diazo compound obtained has the formula:

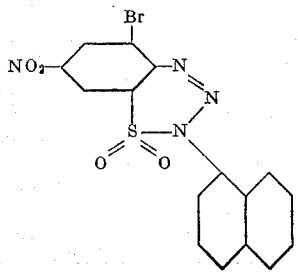

The naphthyl group of the sulfonamide compound can be replaced, for example, by a 2-methoxynaphthyl, 4-hydroxynaphthyl or a 2-hydroxynaphthyl nucleus to obtain cyclic diazo compounds of our invention which have the same formula as that just given except for the fact that the naphthyl group is replaced by the groups just mentioned.

Example 9

0.1 gram mole of 1-amino-4-nitrobenzene-6-sulfone-β-sulfoethylamide is diazotized in 65% nitric acid with sodium nitrite at a temperature of 0–5° C. Upon completion of the diazotization reaction the diazonium solution resulting is poured into water and a salt such as sodium chloride is added, following which sufficient sodium bicarbonate is added to effect complete precipitation of a yellow crystalline compound. The yellow crystalline compound thus precipitated is recovered by filtration and washed with a cold dilute aqueous salt solution. The compound obtained has the formula:

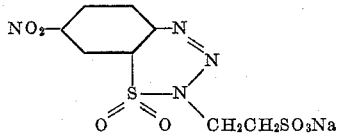

The β-sulfoethyl group of the sulfonamide compound can be replaced by a γ-sulfopropyl, a δ-sulfobutyl, a β-sulfatoethyl, a γ-sulfatopropyl, a β-hydroxy-γ-sulfopropyl, β-carboxyethyl, γ-carboxypropyl, β-cyanoethyl or a glycyl group, for example, and the reaction carried out as described above to obtain cyclic diazo compounds of the invention which have the same formula as that given above except that the β-sulfoethyl group is replaced by the groups just named.

Additional o-aminobenzenesulfoneamide compounds that can be used in preparing the cyclic diazo compounds of our invention include, for example, 1-amino-4-chlorobenzene-6-sulfonethylamide, 1-amino-2-methylbenzene-6-sulfonemethylamide, 1-amino-2-methoxybenzene-6-sulfone-β-methoxyethylamide, 1-amino-4-sulfonicbenzene-6-sulfonethylamide, 1-amino-2,4-di-sulfone(monoethyl)-amidebenzene, 1-amino-4-acetobenzene - 6 - sulfone-β-hydroxyethyl - amide, 1-amino-2-methylsulfonebenzene - 6 - sulfonethylamide, 1-amino-2-carboxy-4-nitrobenzene-6-sulfonethylamide, 1-amino-2-carboxamide-4-nitrobenzene-6-β-methoxyethylamide, 1-amino-2-carboxyethyl (COOC$_2$H$_5$) - 4 - nitrobenzene - 6 - sulfoneallylamide

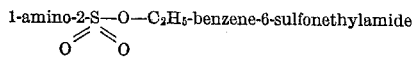

1-amino-3-acetaminobenzene- 6 -sulfonemethylamide, 1-amino-2-cyano-4-nitrobenzene-6-sulfone-β, γ-dihydroxypropylamide, 1-amino-2-thiocyano-4-nitrobenzene -6- sulfone-β-hydroxypropylamide and 1-amino-4-nitrobenzene-6-sulfonebutylamide.

It will be understood that the examples given are intended to be illustrative and not limitative of the invention as many compounds within the teaching of the invention but not specifically disclosed can be prepared. Thus when the member R is a phenyl nucleus it may be phenyl itself as in Example 7 or a substituted phenyl nucleus. To illustrate, the phenyl nucleus of example 7 can also be, for example, o-methoxyphenyl, p-methoxyphenyl p-carboxyphenyl, p-sulfonicphenyl, m-hydroxyphenyl or o-chlorphenyl.

We would here note that o-aminobenzenesulfoneamide compounds containing another NH$_2$ group do not appear to be practical for use in preparing cyclic diazo compounds and consequently compounds wherein X is NH$_2$ have been excluded from the scope of the invention.

The o-aminobenzenesulfoneamide compounds from which the cyclic diazo compounds of our invention are prepared can be prepared by any suitable methods. A considerable number of these compounds are disclosed in the prior art; those not disclosed can be prepared, in general, by the same methods used in preparing the known compounds. The preparation of a number of these o-aminobenzenesulfoneamide compounds is indicated hereinafter.

Compounds having the formula:

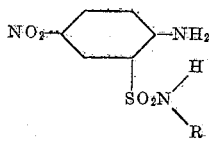

can be prepared as indicated hereinafter.

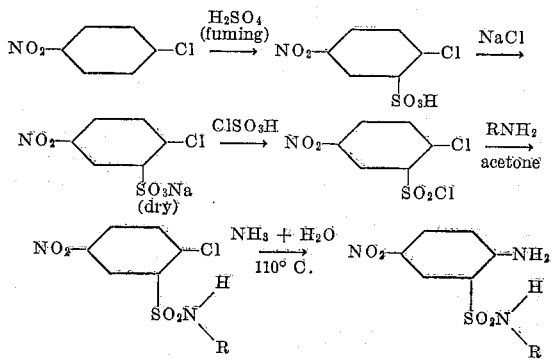

Compounds having the formula:

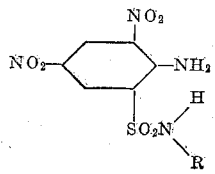

can be prepared as indicated hereinafter.

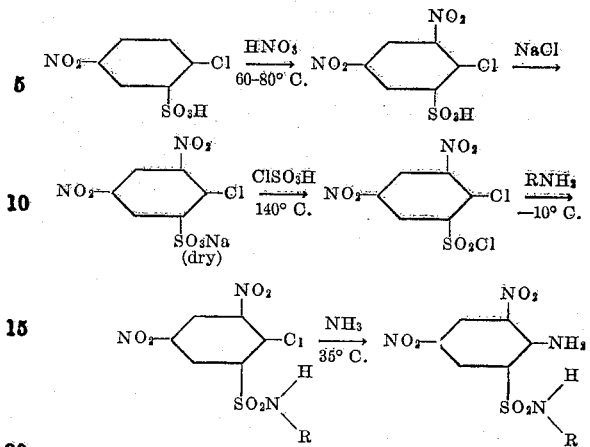

Information concerning the preparation of 1-amino-2,4-dinitrobenzene-6-sulfoneamide compounds is to be found in our copending application Serial No. 401,972, filed July 11, 1941.

Similarly, compounds having the formula:

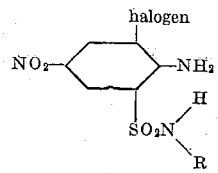

can be prepared by treating the corresponding non-halogenated compounds in an acetic acid medium with a halogenating agent such as chlorine, bromine and iodine monochloride and after completion of the reaction pouring the reaction mixture into water to effect precipitation of the desired compound which can then be recovered by filtration, washed with water and dried.

1 - amino-2,4,6-trisulfoneamidebenzene compounds can be prepared by reacting aniline with sufficient chlorosulfonic acid to introduce three —SO$_2$Cl groups into the 2, 4 and 6 positions of the benzene nucleus and then reacting the compound obtained with one or more amines of the formula RNH$_2$. 1 - amino-2,4-disulfoneamidebenzene compounds can probably be obtained by reacting aniline with chlorosulfonic acid until two —SO$_2$Cl groups are introduced into the benzene nucleus and then reacting the compound with one or more amines having the formula RNH$_2$. It will be understood that R in this discussion of the preparation of o-aminobenzenesulfoneamide compounds has the meaning previously assigned to it.

Additional o-aminobenzenesulfoneamide compounds can be prepared by taking o-aminobenzenesulfoneamide, converting it to a compound of the formula:

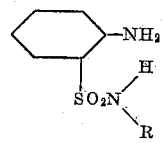

and introducing one or more nuclear substituents into the benzene nucleus by suitable nitration, halogenation and alkylation operations, for example. Further information concerning the preparation of aminobenzenesulfonamide compounds is to be found in Berichte der Deutschen Chemischen Gesellschaft, volume 24, page 3790 (1891).

The term "Nylon" refers to a linear polyamide resin which is believed to be basically described or claimed in U. S. Letters Patent 2,071,250, issued February 16, 1937 to Wallace H. Carothers.

We claim:

1. The cyclic diazo compounds having the formula:

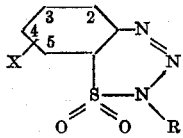

wherein R stands for a member selected from the group consisting of an alkyl group, a cycloalkyl group, an allyl group, an aralkyl group, a furfuryl group, a benzene nucleus and a naphthalene nucleus and X means that at least one of the hydrogen atoms in the positions numbered 2, 3, 4 and 5 is replaced by a univalent non-metallic substituent other than —NH₂.

2. The cyclic diazo compounds having the formula:

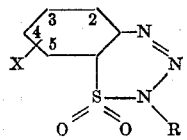

wherein R stands for an alkyl group and X means that at least one of the hydrogen atoms in the positions numbered 2, 3, 4 and 5 is replaced by a univalent non-metallic substituent other than —NH₂.

3. The cyclic diazo compounds having the formula:

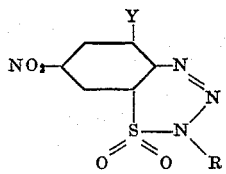

wherein R stands for a member selected from the group consisting of an alkyl group, a cycloalkyl group, an allyl group, an aralkyl group, a furfuryl group, a benzene nucleus and a naphthalene nucleus and Y stands for a member selected from the group consisting of hydrogen, a nitro group and a halogen atom.

4. The cyclic diazo compounds having the formula:

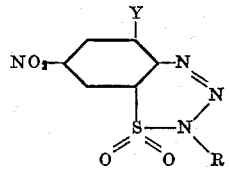

wherein R stands for an alkyl group and Y stands for a member selected from the group consisting of hydrogen, a nitro group and a halogen atom.

5. The cyclic diazo compounds having the formula:

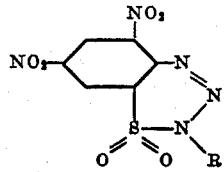

wherein R stands for a member selected from the group consisting of an alkyl group, a cycloalkyl group, an allyl group, an aralkyl group, a furfuryl group, a benzene nucleus and a naphthalene nucleus.

6. The cyclic diazo compounds having the formula:

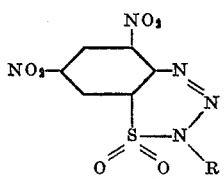

wherein R stands for an alkyl group.

7. The cyclic diazo compounds having the formula:

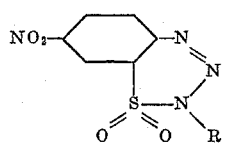

wherein R stands for a member selected from the group consisting of an alkyl group, a cycloalkyl group, an allyl group, an aralkyl group, a furfuryl group, a benzene nucleus and a naphthalene nucleus.

8. The cyclic diazo compounds having the formula:

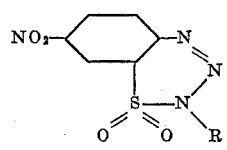

wherein R stands for an alkyl group.

9. The cyclic diazo compound having the formula:

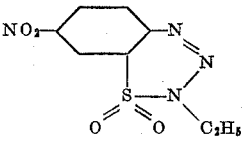

10. The cyclic diazo compound having the formula:

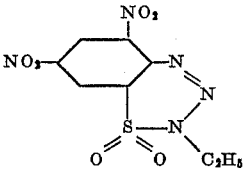

11. The cyclic diazo compound having the formula:

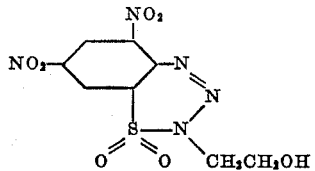

JOSEPH B. DICKEY.
JAMES G. McNALLY.